United States Patent
Twiestmeyer

(10) Patent No.: US 6,641,109 B1
(45) Date of Patent: Nov. 4, 2003

(54) APPARATUS FOR REDUCING THE FLUID PRESSURE WITHIN A HYDRAULIC CIRCUIT

(76) Inventor: Clark T. Twiestmeyer, P.O. Box 626, Fullerton, NE (US) 68638

( * ) Notice: Subject to any disclaimer, the term of this patent is extended or adjusted under 35 U.S.C. 154(b) by 28 days.

(21) Appl. No.: 10/046,570

(22) Filed: Jan. 14, 2002

(51) Int. Cl.$^7$ .......................... F16K 51/00; F16K 31/44
(52) U.S. Cl. ..................................... 251/149.6; 251/148
(58) Field of Search ................................ 251/148–152, 251/149.6

(56) References Cited

U.S. PATENT DOCUMENTS

| | | | | |
|---|---|---|---|---|
| 3,036,595 A | * | 5/1962 | Rogers ..................... | 251/149.6 |
| 3,104,088 A | * | 9/1963 | Cator ....................... | 251/149.6 |
| 3,441,046 A | * | 4/1969 | Cranage ................... | 251/149.6 |
| 4,527,587 A | * | 7/1985 | Fairlamb .................. | 251/149.6 |
| 4,921,013 A | * | 5/1990 | Spalink et al. .......... | 137/614.05 |
| 5,385,331 A | * | 1/1995 | Allread et al. ........... | 251/149.6 |
| 5,586,748 A | * | 12/1996 | Kish ........................ | 251/149.8 |

* cited by examiner

Primary Examiner—Paul J. Hirsch
(74) Attorney, Agent, or Firm—Thomte, Mazour & Niebergall; Dennis L. Thomte

(57) ABSTRACT

An auxiliary coupler element has been provided for reducing the fluid pressure within a hydraulic circuit. The auxiliary coupler element includes first and second ends which are in fluid communication with each other with the first end of the auxiliary coupler element being adapted to detachably receive a conventional male coupler element of a hydraulic hose extending from a hydraulic cylinder or circuit. A hydraulic fluid reservoir is in communication with the interior of the auxiliary coupler element. An actuator rod threadably extends into the auxiliary coupler element and is threadably moved from a retracted position to an extended position. When the conventional male coupler element has been inserted into the auxiliary coupler element, the actuator is threadably moved to its extended position which causes the check valve ball of the male coupler element to unseat from its valve seat, thereby permitting hydraulic fluid from the circuit to bypass the check valve ball and to be collected in the fluid reservoir of the auxiliary coupler element. When sufficient hydraulic fluid has been removed from the hydraulic circuit to reduce the hydraulic pressure therein, the actuator is threadably moved to its retracted position, thereby permitting the check valve ball of the male coupler element to close. The male coupler element may then be disconnected or decoupled from the auxiliary coupler element. The male coupler element may then easily be connected to a conventional female coupler element since pressure against the ball check valve therein has been reduced.

4 Claims, 3 Drawing Sheets

APPARATUS FOR REDUCING THE FLUID PRESSURE WITHIN A HYDRAULIC CIRCUIT

BACKGROUND OF THE INVENTION

1. Field of the Invention

This invention relates to an apparatus for reducing the fluid pressure within a hydraulic circuit in order to enable a male coupler element to be more easily coupled to a female coupler element.

2. Description of the Related Art

Hydraulic cylinders are employed on many types of farm equipment such as cultivators, harrows, discs, plows, etc., in order to raise and lower the earth engaging members thereof. In most cases, the hydraulic cylinders of such equipment have one or more hydraulic hoses or lines fluidly connected thereto for extending and retracting the cylinder rod thereof. The free end of the hose or hoses normally has a male coupler element connected thereto which is adapted to be quickly coupled to a female coupler element which is in fluid communication with the source of hydraulic fluid which is usually located on the prime mover such as a tractor or the like. The male coupler element includes a normally closed, spring-loaded, ball check valve. The female coupler element also frequently has a normally closed, spring-loaded, ball check valve. When the male and female coupler elements are coupled together, the ball check valves therein are open to permit the flow of hydraulic fluid therethrough. When the male coupler element is disconnected from the female coupler element, the ball check valve therein automatically closes to prevent the escape of hydraulic fluid from the hose and cylinder. As the male coupler element is being coupled to the female coupler element, it is necessary that sufficient force be applied to unseat the ball check valve in the male coupler element so that hydraulic fluid may pass through the male coupler element. Even in "normal" conditions, it is sometimes difficult to couple the male and female coupler elements together due to the spring resistance of the ball check valve in the male coupler element. Further, when the coupler elements have been disconnected and the hydraulic cylinder and hose have been subjected to warm temperatures, the hydraulic fluid in the cylinder and hose expands thereby causing an increase in the hydraulic fluid pressure within the hose which additionally resists the opening movement of the ball check valve in the male coupler element during the coupling operation. Additionally, when the ground engaging elements of the implement have been raised out of ground engagement before the coupling elements have been disconnected, the weight of the ground engaging elements imposed on the cylinder may also increase the hydraulic fluid pressure within the cylinder and hose thereby making the coupling process more difficult.

In all situations where hydraulic pressure is present within the hydraulic hose prior to the coupling operation, the possibility of fluid spillage from the coupling elements is great. Although the situations described above relate to farm implements, the same problems exist whenever male coupler elements are coupled to female coupler elements such as on truck-trailer combinations, etc.

SUMMARY OF THE INVENTION

An apparatus is provided for reducing the fluid pressure within a hydraulic circuit which includes a conventional male coupler having a normally closed, ball check valve therein. The apparatus of this invention comprises an auxiliary female coupling element having a first end and a second end which are in fluid communication with each other. The first end of the auxiliary coupler element includes a female portion adapted to detachably receive the male coupler element therein so that the male coupler element is coupled to said auxiliary coupler element. A hydraulic fluid reservoir is in fluid communication with the auxiliary coupler element. A selectively movable actuator extends into the auxiliary coupler element for selective engagement with the ball check valve in the male coupler element when the coupler elements are coupled together so that the ball check valve may be at least partially opened to permit a portion of the hydraulic fluid in the hydraulic line to bypass the ball check valve and to flow into said reservoir, thereby reducing the fluid pressure within the hydraulic line. In the preferred embodiment, the selectively movable actuator comprises an elongated rod which is threadably mounted in the auxiliary coupler element.

It is therefore a principal object of the invention to provide an improved apparatus for reducing the fluid pressure within a hydraulic circuit or line;

Still another object of the invention is to provide a convenient means for draining hydraulic fluid from a hydraulic line or circuit so that the pressure within the hydraulic line or circuit is reduced without the spillage of hydraulic fluid.

Still another object of the invention is to provide a device of the type described which is easy to use.

Still another object of the invention is to provide a portable auxiliary coupler unit which may be easily carried and/or stored for use on many different hydraulic circuits.

These and other objects will be apparent to those skilled in the art.

DESCRIPTION OF THE PREFERRED EMBODIMENT

Figure 1:
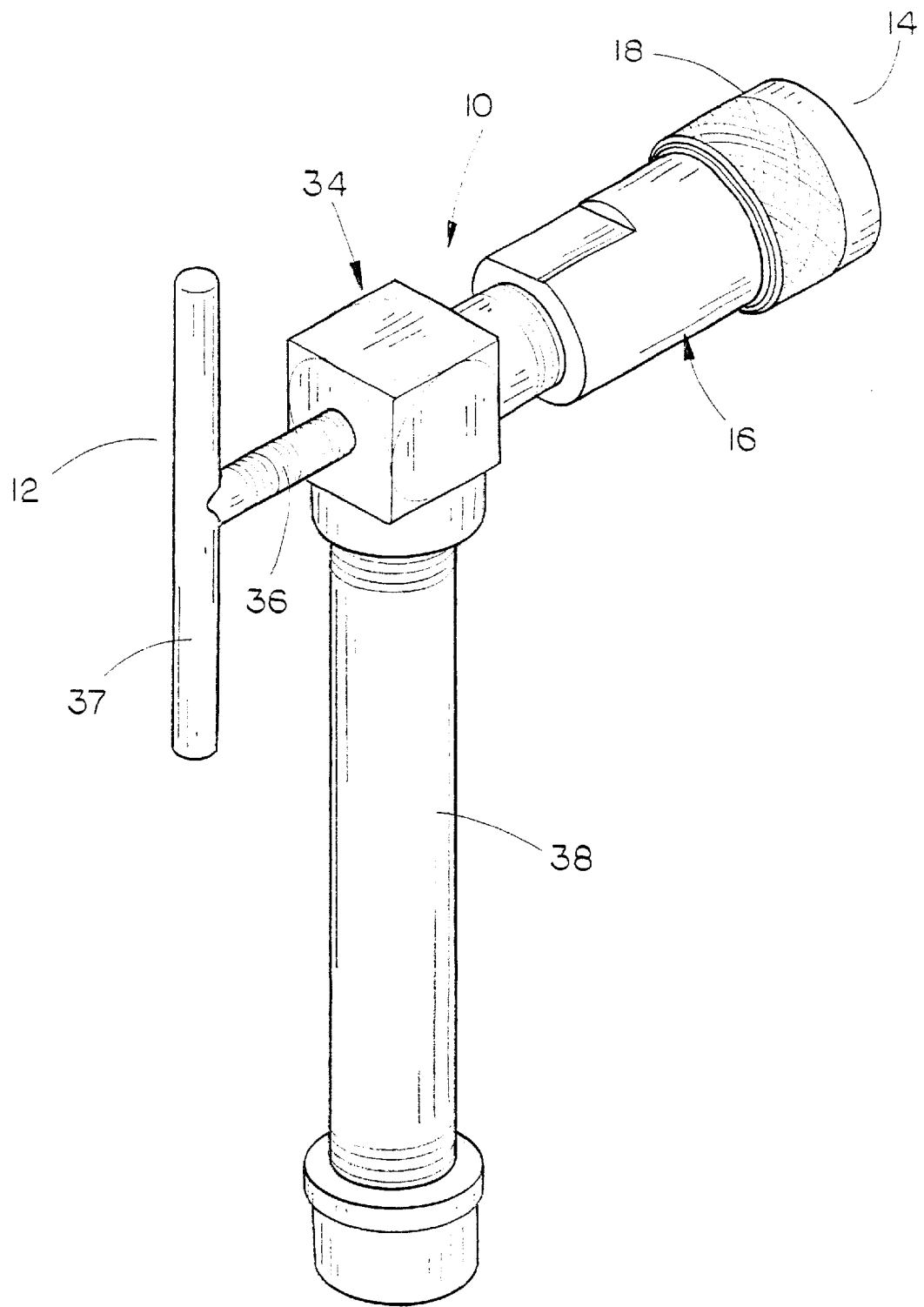
FIG. 1 is a perspective view of the apparatus for reducing the fluid pressure within a hydraulic circuit.

The apparatus of this invention for reducing the fluid pressure within a hydraulic circuit or line is generally designated by the reference numeral 10 and may be termed as being an auxiliary coupler element. Auxiliary coupler element 10 generally includes ends 12 and 14. A female coupler element 16 is provided at end 14 of auxiliary coupler element 10 and is a generally conventional female coupler element except that the ball check valve and spring for normally closing the same has been removed. Female coupler element 16 includes the conventional receptacle 18 including detent balls 20 and O-ring 22 found on most female coupler elements.

The numeral 24 refers to a conventional male coupler element having a hose or line 26 extending therefrom which is connected to a hydraulic cylinder or cylinders in a hydraulic circuit. Male coupler element 24 includes a check valve ball 28 which is normally urged in sealing engagement with a valve seat 30 by means of spring 32.

The female coupler element 16 is fluidly connected to an elbow coupling 34. The numeral 36 refers to a threaded actuator rod which is threadably mounted in coupling 34 and which has a handle 37 at one end thereof. The actuator rod 36 is threadably movable from the retracted position seen in FIG. 2 to the extended position seen in FIG. 3. Fluid reservoir or tube 38 is in fluid communication with the interior of coupling 34, as illustrated in the drawings. Cap 40 selectively closes the end of tube 38.

Figure 2:
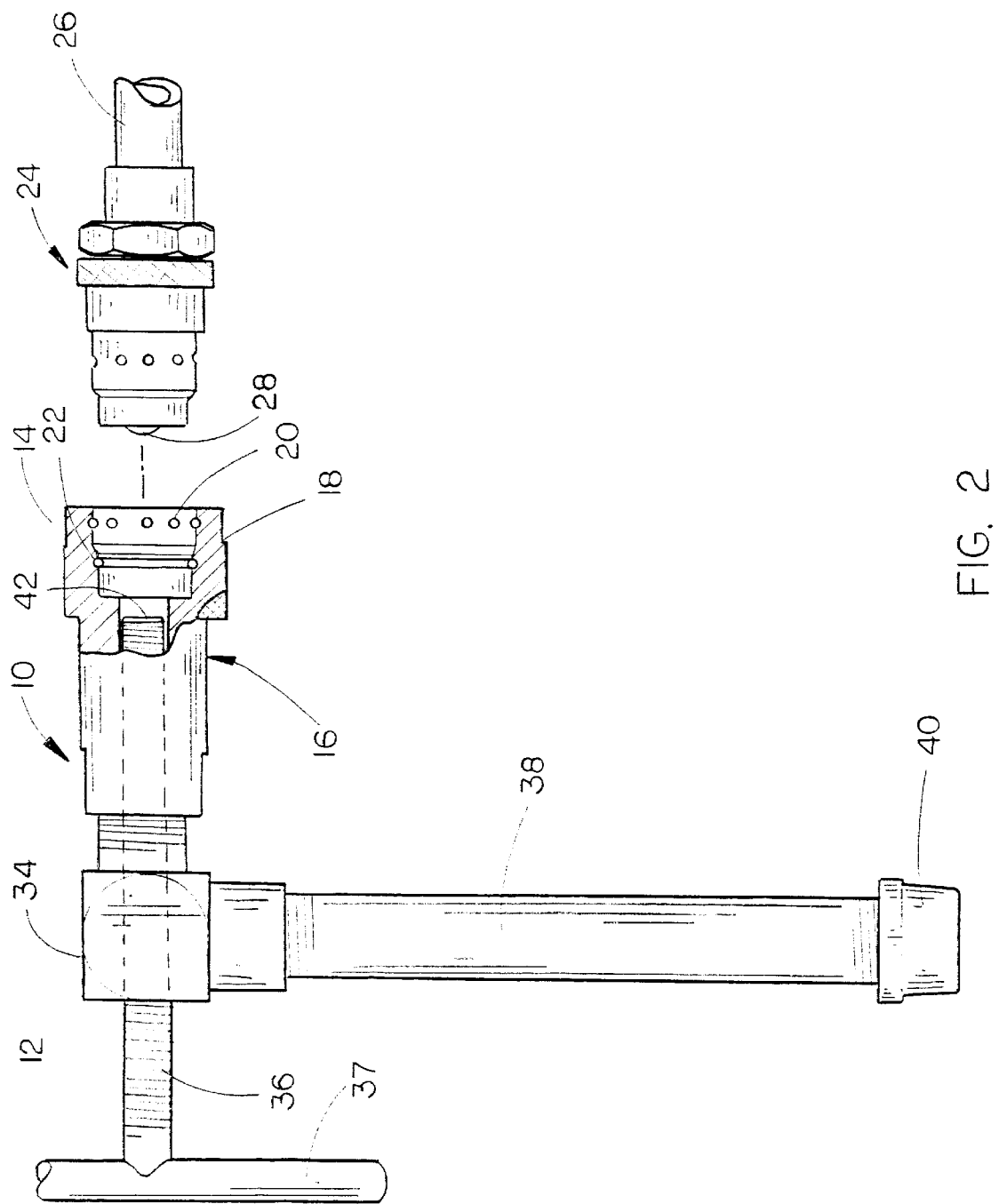
FIG. 2 is a side elevational view of the apparatus of this invention illustrating its relationship with a male coupler element with portions of the apparatus cut away to more fully illustrate the invention.
Figure 3:
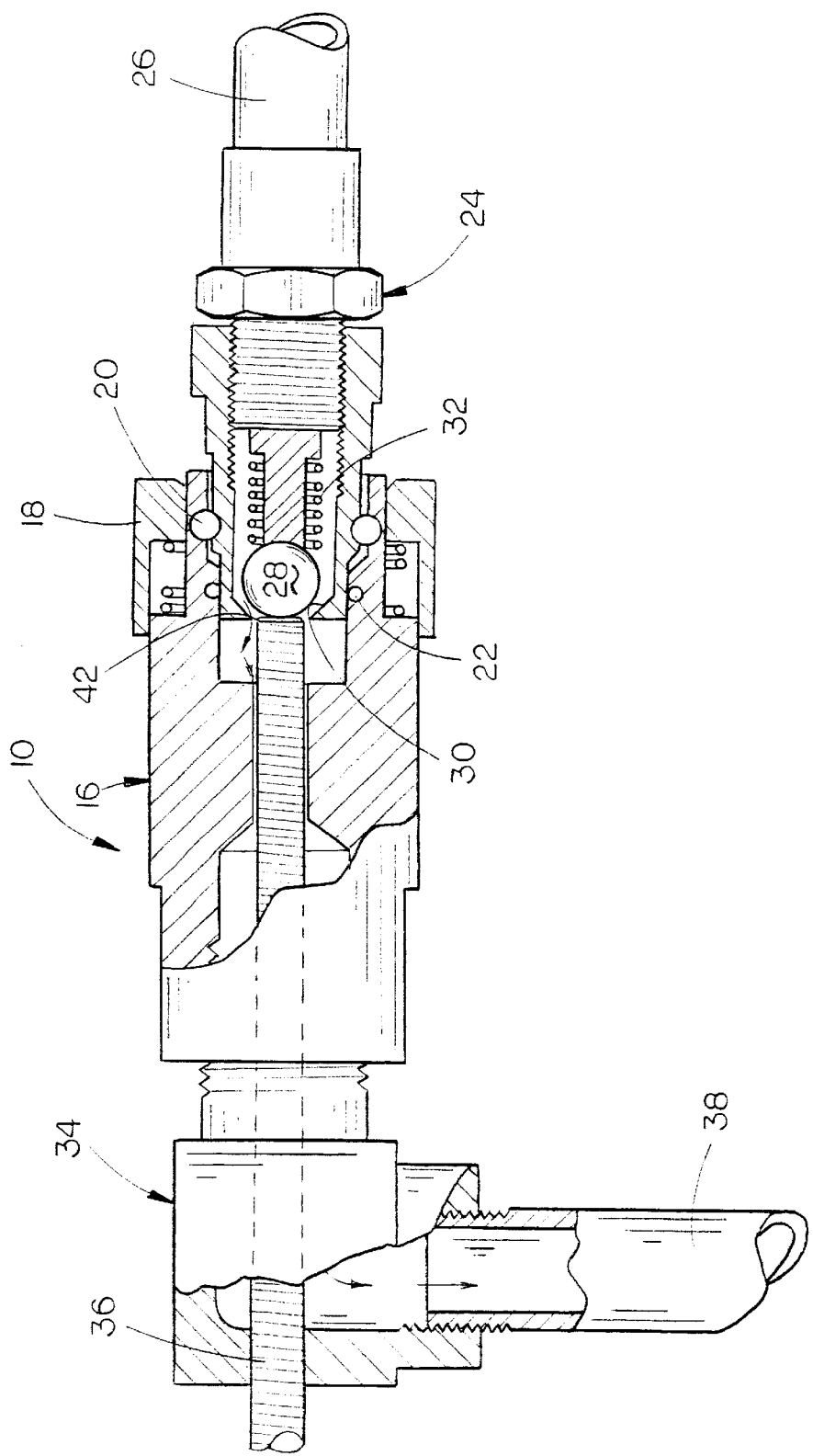
FIG. 3 is a partial sectional view illustrating the apparatus of this invention coupled to a conventional male coupler element to reduce the fluid pressure within the hydraulic circuit to which the male coupler is connected.

When it is desired to reduce the hydraulic pressure within the hydraulic line or circuit to which the male coupler element 24 is connected, the actuator 36 is first threadably moved to its retracted position of FIG. 2 if not already in that position. The male coupler element 24 is then inserted into the female receptacle 18 of the female coupler 16 and the same is easily accomplished since there is no need to open the check valve ball 28 during this initial coupling operation. When the male coupler element 24 has been received within the female coupler element 16, the actuator 36 is threadably rotated to cause the inner end 42 thereof to engage the check valve ball 28 and to unseat the check valve ball 28 from the valve seat 30 which causes hydraulic fluid to pass from the male coupler 24 and into the auxiliary coupler element 10 with the fluid being directed to the reservoir or tube 38 which is selectively closed by cap 40. When sufficient hydraulic fluid has been delivered to the reservoir 38 so that the hydraulic fluid pressure within the hydraulic circuit has been sufficiently reduced, the actuator 36 is threadably moved from its extended position of FIG. 3 to its retracted position, thereby causing the check valve ball 28 to again seal against valve seat 30, thereby closing the male coupler element 24. The male coupler element 24 is then detached from the female coupler element 16 in conventional fashion. The male coupler element 24 may then be coupled to a conventional female coupler element in the hydraulic circuit and the same will be easily accomplished since the hydraulic fluid pressure against the check valve ball 28 has been sufficiently reduced.

Although the reservoir 38 has been shown to comprise a pipe or tube which is closed by cap 40, the tube 38 could be replaced with a hose or the like which extends to a suitable container or receptacle. Hydraulic fluid within the tube or reservoir 38 may be reclaimed by simply removing the cap 40 and draining the hydraulic fluid therein into a suitable receptacle.

Thus it can be seen that a novel apparatus has been provided for reducing the fluid pressure within a hydraulic circuit.

Thus it can be seen that the invention accomplishes at least all of its stated objectives.

I claim:

1. An apparatus for reducing the fluid pressure within a hydraulic line or circuit having a male coupler element including a normally closed, check valve ball, comprising:

an auxiliary coupler element having a first end and a second end which are in fluid communication with each other;

said first end of said auxiliary coupler element including a female coupler portion adapted to detachably receive the male coupler element therein so that the male coupler element is detachably coupled to said auxiliary coupler element;

a hydraulic fluid reclaiming reservoir in fluid communication with said auxiliary coupler element;

a selectively movable actuator extending into said auxiliary coupler element for selective engagement with the check valve ball in the male coupler element when the coupler elements are coupled together so that the check valve ball may be at least partially opened to permit a portion of the hydraulic fluid in the hydraulic line to bypass the check valve ball and to flow into said reclaiming reservoir thereby reducing the fluid pressure within the hydraulic line.

2. The apparatus of claim 1 wherein said actuator comprises an elongated rod threadably mounted in said auxiliary coupler element.

3. The apparatus of claim 1 wherein said reclaiming reservoir comprises an elongated, hollow tube which extends from said auxiliary coupler element.

4. The apparatus of claim 3 wherein said tube has a selectively closable discharge end.

* * * * *